April 1, 1958 F. T. SPERA 2,829,202

COMBINED MICROPHONE AND TELEPHONE PICKUP FOR HEARING AIDS

Filed Dec. 30, 1955

INVENTOR.
FRANK T. SPERA

BY

[signature]

ATTORNEY

United States Patent Office 2,829,202

Patented Apr. 1, 1958

2,829,202

COMBINED MICROPHONE AND TELEPHONE PICKUP FOR HEARING AIDS

Frank T. Spera, Philadelphia, Pa., assignor to Philco Corporation, Philadelphia, Pa., a corporation of Pennsylvania Application December 30, 1955, Serial No. 556,560

5 Claims. (Cl. 179—1)

This invention relates to hearing aids and more particularly to the provision therein of means to enable the user to carry on a telephone conversation.

Hearing aids now commonly used by persons having deficient hearing comprise a microphone, an amplifier, and an earpiece to which amplified sound currents are supplied. To enable the user to carry on a telephone conversation, some hearing aids have been provided with a telephone pickup comprising a coil wound on a magnetic core, and means for connecting the coil to the amplifier. When the coil is connected to the amplifier and a telephone receiver is placed in proximity to the coil, sound currents are induced in the coil and are supplied to the amplifier.

While it is highly desirable to provide such a telephone pickup in a hearing aid, heretofore it has meant the addition of a space-occupying unit in a device which must be kept to a minimum size. It has also meant the addition of some weight and increase of cost of manufacture.

The present invention has for its purpose the provision of a telephone pickup in a hearing aid without utilizing significant space and without adding significantly to the weight and cost of the hearing aid.

The invention takes advantage of the fact that the microphone of a hearing aid has a casing which is composed at least in part of magnetic material. In accordance with this invention, a telephone pickup coil is wound about the microphone casing so as to utilize the casing both as a supporting means for the coil and as a magnetic core therefor to enable inductive pickup from a telephone receiver placed in proximity to the coil. With this arrangement, practically no additional space is required to adapt the hearing aid for telephone pickup, and the additional cost and weight are insignificant.

A further advantage of this invention, as will be seen from the description to follow, is that it provides a single and integral microphone-telephone pickup unit, and it simplifies the provision of the electrical connections which are necessary to enable selective switching of the microphone and the telephone pickup.

Reference is now made to the accompanying drawing, wherein

Figure 1:
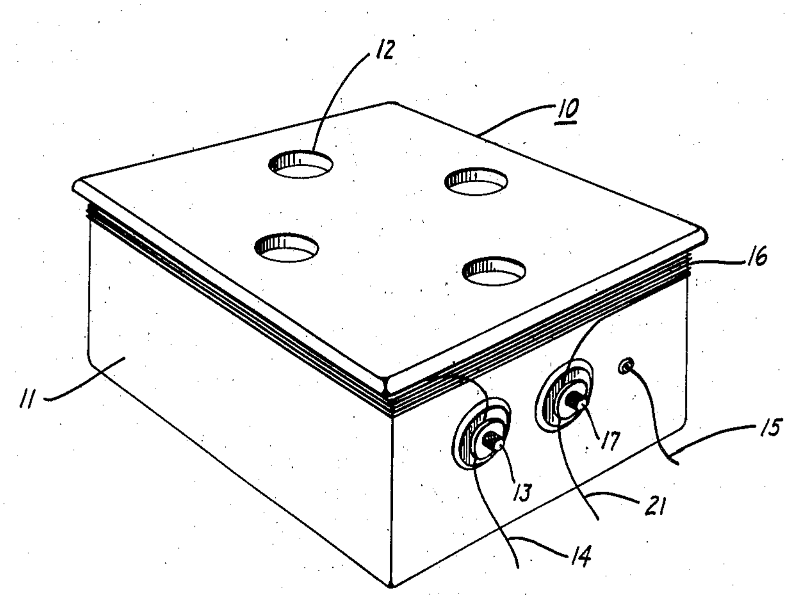
Figure 2:
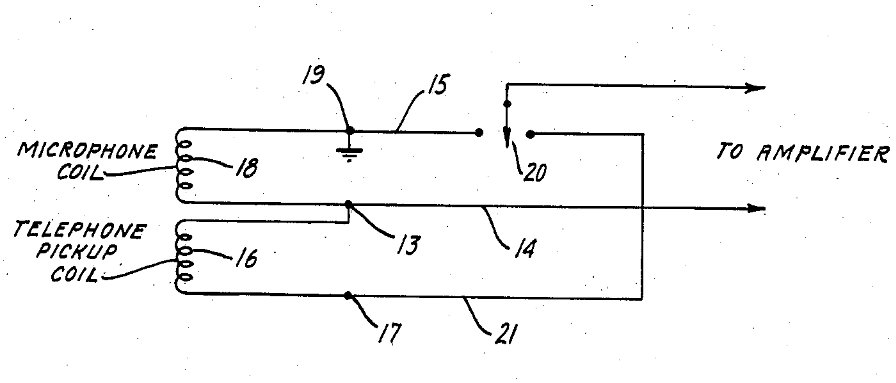

Fig. 1 is a relatively large scale perspective view of a combined microphone and telephone pickup for a hearing aid according to this invention; and Fig. 2 is a diagrammatic illustration of the electrical connections by which the microphone coil and the telephone pickup coil may be selectively connected to the amplifier.

Referring first to Fig. 1, there is shown a conventional microphone 10 for a hearing aid, the microphone comprising a casing 11 containing the elements of the microphone including the microphone coil. The casing normally is composed of steel which may be plated with copper to prevent corrosion. The metal casing serves as a shield and also as a protective housing for the microphone elements. The casing has apertures 12 for admission of sound to the microphone. One end of the microphone coil is connected to a terminal 13 which is insulated from the casing, while the other end of the microphone coil may be grounded to the casing 11. Leads 14 and 15 extend from the terminal 13 and the casing 11 respectively.

In accordance with the present invention, a telephone pickup coil 16 is wound about the casing 11, so that the casing furnishes support for the coil and also serves as a magnetic core therefor to enable inductive pickup from a telephone receiver as hereinbefore described. By way of example, in one physical embodiment of the invention the coil 16 comprises fifty turns of No. 42 enameled wire. The coil may be secured in any suitable manner, as by coating it with a suitable non-conductive cement or varnish after it has been wound on the casing. In the preferred embodiment as illustrated, one end of coil 16 is connected to terminal 13, while the other end of the coil is connected to a second terminal 17 provided on the casing 11 and insulated therefrom.

Actual tests have shown that, with the telephone pickup coil wound about the usual steel microphone casing, the device performs at least as well as any of the telephone pickups heretofore used in hearing aids, and at the same time this arrangement has the advantages hereinbefore mentioned. The steel casing effectively provides a magnetic core of substantial volume. Of course, greater inductive pickup could be obtained if the casing were formed of material, such as soft iron, having greater permeability than steel. And, of course, the casing could be composed only in part of magnetic material and still serve as a magnetic core for the coil, with the latter wound about a magnetic portion of the casing.

Referring again to Fig. 1, it will be noted that the microphone casing is of box-like form and the coil 16 is wound about the smaller surfaces adjacent to the front face or cover. This is a convenient location for the coil and furthermore it disposes the coil for best inductive coupling with the coil of a telephone receiver whose face is placed in confronting relation to the face of the microphone.

Fig. 2 shows the electrical connections by which the microphone coil and the telephone pickup coil may be selectively connected to the amplifier of the hearing aid. As shown in this figure, the microphone coil 18 is connected between the ground point 19 and the terminal 13, while the telephone pickup coil 16 is connected between terminals 13 and 17. Lead 14 extends from terminal 13 directly to the amplifier of the hearing aid, while lead 15 extends to one of the stationary contacts of a single pole double-throw switch 20. A connecting lead 21 extends from terminal 17 to the other stationary contact of the switch 20. Thus, in one position of the switch 20, the microphone coil 18 is connected to the amplifier, while in the other position of the switch, the telephone pickup coil 16 is connected to the amplifier.

While a preferred embodiment of the invention has been illustrated and described, it is to be understood that the invention is not limited thereto but contemplates such modifications and further embodiments as may occur to those skilled in the art.

I claim:

1. A combined microphone and telephone pickup unit for use in a hearing aid, comprising a microphone having a casing composed at least in part of magnetic material, and a telephone pickup coil wound about a magnetic portion of said casing so that the latter furnishes support for the coil and also serves as a magnetic core therefor to enable inductive pickup by said coil from a telephone receiver placed in proximity to said unit.

2. A combined microphone and telephone pickup unit for use in a hearing aid, comprising a microphone having a metal casing containing a microphone coil one end of which is grounded to the casing and the other end of which is connected to an insulated terminal on the casing, said casing being composed at least in part of magnetic material, a second insulated terminal on said casing spaced from the first terminal, and a telephone pickup coil wound about a magnetic portion of said casing and having its ends connected to said terminals, the casing furnishing support for said telephone pickup coil and also serving as a magnetic core therefor to enable inductive pickup by said pickup coil from a telephone receiver placed in proximity to said unit.

3. A pickup unit for a hearing aid, comprising a casing composed at least in part of magnetic material and adapted to house microphone elements, and a telephone pickup coil wound about a magnetic portion of said casing so that the latter furnishes support for the coil and also serves as a magnetic core therefor to enable inductive pickup by said coil from a telephone receiver placed in proximity to said unit.

4. A pickup unit for a hearing aid, comprising a casing composed at least in part of magnetic material and adapted to house microphone elements, a pair of spaced terminals mounted on said casing and insulated therefrom, and a telephone pickup coil wound about a magnetic portion of said casing and having its ends connected to said terminals, the casing furnishing support for said coil and also serving as a magnetic core therefor to enable inductive pickup by said coil from a telephone receiver placed in proximity to said unit.

5. A pickup unit for a hearing aid, comprising a box-like casing composed at least in part of magnetic material and adapted to house microphone elements, and a telephone pickup coil wound about a magnetic portion of said casing adjacent to the front face thereof, so that the casing furnishes support for the coil and also serves as a magnetic core therefor to enable optimum inductive coupling with the coil of a telephone receiver placed in proximate face-to-face relation with said casing.

References Cited in the file of this patent

UNITED STATES PATENTS

| | | |
|---|---|---|
| 2,445,425 | Gabbert | July 20, 1948 |
| 2,554,834 | Lavery | May 29, 1951 |
| 2,656,421 | Lybarger | Oct. 20, 1953 |